(12) United States Patent
Shibutani et al.

(10) Patent No.: US 8,569,414 B2
(45) Date of Patent: Oct. 29, 2013

(54) POLYVINYL ALCOHOL RESIN COMPOSITION AND MOLDED ARTICLE THEREOF

(75) Inventors: Mitsuo Shibutani, Osaka (JP); Kazutoshi Tsuji, Osaka (JP); Kaoru Inoue, Osaka (JP); Norihito Sakai, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 13/407,278

(22) Filed: Feb. 28, 2012

(65) Prior Publication Data
US 2012/0157627 A1    Jun. 21, 2012

Related U.S. Application Data

(63) Continuation of application No. PCT/JP2010/064139, filed on Aug. 23, 2010.

(30) Foreign Application Priority Data

Sep. 3, 2009    (JP) .................................. 2009-203401

(51) Int. Cl.
*C08G 63/48* (2006.01)
*C08L 29/04* (2006.01)

(52) U.S. Cl.
USPC ........................................... 525/57; 524/503

(58) Field of Classification Search
USPC ........................................... 525/57; 524/503
See application file for complete search history.

(56) References Cited

U.S. PATENT DOCUMENTS

| 2004/0204530 | A1 | 10/2004 | Masuda et al. | |
|---|---|---|---|---|
| 2005/0119414 | A1* | 6/2005 | Sasagawa et al. | 525/242 |
| 2009/0075105 | A1* | 3/2009 | Ono et al. | 428/474.4 |
| 2010/0261830 | A1 | 10/2010 | Shibutani et al. | |
| 2012/0041118 | A1 | 2/2012 | Shibutani et al. | |

FOREIGN PATENT DOCUMENTS

| JP | 2001114977 A | * | 4/2001 |
|---|---|---|---|
| JP | 2004075866 A | * | 3/2004 |
| JP | 2005-298697 | | 10/2005 |
| JP | 2006-95825 | | 4/2006 |
| JP | 2006-312313 | | 11/2006 |
| JP | 2007-126586 | | 5/2007 |
| JP | 2004-189916 | | 7/2007 |
| JP | 2007-290379 | | 11/2007 |
| JP | 2007-326943 | | 12/2007 |

OTHER PUBLICATIONS

Search report from International Application No. PCT/JP2010/064139, mail date is Nov. 2, 2010.

* cited by examiner

*Primary Examiner* — David W Wu
*Assistant Examiner* — Marie Reddick
(74) *Attorney, Agent, or Firm* — Greenblum & Bernstein, P.L.C.

(57) ABSTRACT

Disclosed is a polyvinyl alcohol resin composition capable of providing a melt-molded article with superior gas barrier properties and flex crack resistance. The resin composition comprises (A) a PVA resin having 1,2-diol unit in side chain thereof; and (B) a mixture of block copolymers each having an aromatic vinyl polymer block, and a conjugated diene polymer block and/or hydrogenated thereof, wherein the (B) mixture of block copolymers includes (B1) a block copolymer having no carboxyl group and (B2) a block copolymer modified with a carboxyl group-containing compound.

5 Claims, No Drawings

POLYVINYL ALCOHOL RESIN COMPOSITION AND MOLDED ARTICLE THEREOF

CLAIM FOR PRIORITY

This application is a continuation of PCT/JP2010/064139 filed Aug. 23, 2010, and claims the priority benefit of Japanese Application No. 2009-230401, filed Sep. 3, 2009, the contents of which is expressly incorporated by reference in its entirety.

TECHNICAL FIELD

The present invention relates to a resin composition containing a polyvinyl alcohol resin as a main component, and more particularly, to a polyvinyl alcohol resin composition not only excellent in gas barrier properties but also capable of providing a melt-molded article with superior flex crack resistance. The present invention also relates to a molded article using the resin composition.

BACKGROUND ART

Polyvinyl alcohol (hereinafter abbreviated as PVA) resins have excellent gas barrier properties, toughness, and transparency. Therefore, they are preferably used for packaging materials for various articles.

However, since the melting point and the decomposition point of each of the PVA resins are close to each other, the PVA resins cannot be melt-molded substantially. Therefore, several limited methods can be employed for PVA resin moldings, which include: a method in which a water solution of PVA resin is poured on a substrate and dried, thus, obtaining a resultant film; and a method in which a water solution of PVA resin is coated on a substrate, and dried, resulting in a desired coated substrate. Such a limitation greatly prevents the development of PVA resins from applying the resin for the wide use as wrapping materials.

Recently, a PVA resin that can be melt-molded and has excellent gas barrier properties has been proposed. This PVA resin has an 1,2-diol unit in its side chains. See, for example, Patent document 1.

A PVA resin has a high melting temperature and has excellent gas barrier properties, and such characteristics would be resulted from the followings: the resin has a simple molecular structure, and thus has high crystallinity; and molecular chains of the resin are strongly confined by hydrogen bonds formed from hydroxyl groups contained in its crystalline portions and non-crystalline portions. The PVA resin described in Patent document 1 has lower crystallinity because of the steric hindrance caused by its side chains, thus has lower melting temperature. However, degradation of gas barrier properties resulting from the lower crystallinity is assumed to be suppressed by means of strong hydrogen bonds formed from side chain-hydroxyl groups contained in the non-crystalline portions.

However, the high crystallinity and the strong confinement of PVA resin molecules lead to poor flexibility and poor impact resistance when such a PVA resin is compared with other thermoplastic resins. The PVA resin described in Patent document 1 has been improved with respect to such problems to a certain degree by means of the introduction of 1,2-diol unit to the side chains. However, the PVA resin is still insufficient for practical use.

Ethylene-vinyl alcohol copolymer (hereinafter abbreviated as EVOH) has a structure in which ethylene units are introduced into the main chain of PVA resin molecule, and such a structure provides the resin with melt-moldability. Therefore, EVOH is widely used for various packaging materials although it has relatively poor gas barrier properties compared with PVA resins. It would be greatly desired to provide EVOH with flexibility and impact resistance similar to the case of PVA resins.

For such purposes, various studies have been widely conducted, in which a thermoplastic elastomer is blended with a PVA resin or EVOH, resulting in a formation of a sea-island structure, wherein the PVA resin or EVOH provides the sea part and the thermoplastic elastomer provides the island part, thus, improving the flexibility and impact resistance without impairing the gas barrier properties.

For example, a thermoplastic resin composition with improved flexibility and impact resistance is proposed, in which a hydrogenated block copolymer as a thermoplastic elastomer is blended with a water-soluble PVA rein, wherein the hydrogenated block copolymer is obtained by hydrogenation of a block copolymer that contains two or more of blocks of aromatic vinyl polymer and one or more of blocks of conjugated diene polymer. See, for example, Patent document 2.

[Patent document 1] JP2004-075866A
[Patent document 2] JP2001-114977A

DISCLOSURE OF THE INVENTION

Technical Problem to be Solved by the Invention

For the purpose of obtaining a resin composition that can be made into a molded article with highly improved flexibility, the inventors reviewed a combination of the PVA resin described in Patent document 1 and the thermoplastic elastomer described in Patent document 2, wherein the PVA resin has an 1,2-diol unit in its side chains and thus has improved flexibility, and wherein the thermoplastic elastomer is a hydrogenated block copolymer that can provide PVA resins with improved flexibility and impact resistance. This combination achieved a certain degree of improvement, but it was still insufficient for the practical use. Especially, when a film obtained from such a resin composition is put in a severe condition, in which the film is bent repeatedly, pinholes may be formed in the film, thereby gas barrier properties of the film may be deteriorated.

Furthermore, for the purpose of obtaining a polymer having improved compatibility with and dispersibility in PVA resins, the inventors conducted a research with respect to a hydrogenated block copolymer in which carboxyl groups have been introduced. However, a composition containing such a copolymer revealed that it could not be used at a practical level.

Under these circumstances, an object of the present invention is to provide a resin composition capable of obtaining a molded article with excellent gas barrier properties and flex crack resistance.

Means for Solving the Problems

A polyvinyl alcohol resin composition of the invention comprises (A) a polyvinyl alcohol resin (abbreviated as PVA resin); and (B) a mixture of block copolymers each having a block of aromatic vinyl polymer, and a block of a conjugated diene polymer and/or hydrogenated thereof, wherein the PVA resin (A) contains a structural unit of the following formula (1), and the mixture (B) is a combination of (B1) a block copolymer having no carboxyl group and (B2) a block copolymer modified with a carboxyl group-containing compound.

[formula 1]

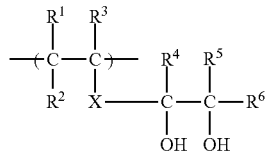

(1)

In the formula, $R^1$, $R^2$ and $R^3$ independently represents a hydrogen or an organic group, X represents a single bond or a linking chain, and $R^4$, $R^5$ and $R^6$ independently represents a hydrogen or an organic group.

The polyvinyl alcohol resin composition as defined above is characterized by that a specific PVA resin having 1,2-diol unit in side chain thereof is employed for the PVA resin (A), and that a combination of (B1) a block copolymer having no carboxyl group and (B2) a block copolymer modified with a carboxyl group-containing compound is employed for thermoplastic elastomer. The (B1) and (B2) each cannot give a sufficient effect to the resin composition when they are independently used. This polyvinyl alcohol resin composition may form a sea-island structure wherein the elastomeric block copolymers (B) are almost homogenously dispersed in a state of minute islands in the sea of the (A) PVA resin having 1,2-diol unit in side chain thereof. Therefore, the stress resulted from deformation of the phase of (A) PVA resin might be weakened by transmitting to (B) block copolymers, as a result, flex resistance of the PVA resin (A) is improved with retaining its gas barrier properties.

Moreover, by employing the combination of (B1) a block copolymer having no carboxyl group and (B2) a block copolymer modified with a carboxyl group-containing compound for a thermoplastic elastomer, the adherence of interface between (A) PVA resin having 1,2-diol unit in side chain thereof and (B) mixture of block copolymers is supposed to be increased, thereby the flex resistance of the resin composition is enhanced without impairing gas barrier properties inherent in the (A) PVA resin.

Effect of the Invention

According to the invention, gas barrier properties resulting from (A) PVA resin having 1,2-diol unit in side chain thereof, and energy attenuation by the block copolymers employed as thermoplastic elastomer are effectively obtained in the polyvinyl alcohol resin composition, and therefore, the molded article produced by melt molding the resin composition has excellent gas barrier properties and superior flex crack resistance.

BEST MODE FOR CARRYING OUT OF THE INVENTION

The following will explain the constitution of the invention but merely show examples (typical examples), and the invention should not be construed as being limited to the examples.

A polyvinyl alcohol resin composition of the invention comprises (A) a polyvinyl alcohol resin; (B) a mixture of block copolymers each having a block of aromatic vinyl polymer, and a block of conjugated diene polymer and/or hydrogenated thereof, wherein the polyvinyl alcohol resin (A) has a structural unit of the formula (1) below, and wherein the mixture (B) is a combination of (B1) a block copolymer having no carboxyl group and (B2) a block copolymer modified with carboxyl group-containing compound.

The components will be explained in order.

[(A) PVA Resin]

First, (A) PVA resin used in the invention is described.

PVA resins used in the inventive resin composition have a structural unit of the following formula (1). In the formula (1), each of $R^1$, $R^2$ and $R^3$ independently represents a hydrogen or an organic group, X represents a single bond or a linking chain, and each of $R^4$, $R^5$ and $R^6$ independently represents a hydrogen or an organic group.

[formula 1]

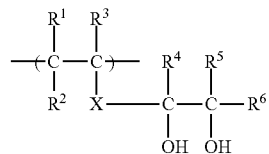

(1)

In particular, it is most preferable that all of $R^1$ to $R^3$ and $R^4$ to $R^6$ in the 1,2-diol structural unit of the formula (1) are hydrogen and X is a single bond. And therefore, a PVA resin having a structural unit of the formula (1') is preferably used.

[formula 1A]

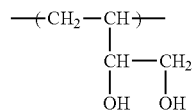

(1')

$R^1$ to $R^3$ and $R^4$ to $R^6$ in the structural unit of the formula (1) may be an organic group within the range where the performances are not significantly impaired. Examples of the organic group include alkyl groups having 1 to 4 carbon atoms such as methyl, ethyl, n-propyl, isopropyl, n-butyl, isobutyl group, tert-butyl group, and so on, and these organic groups can be substituted with a functional group such as halogen, hydroxyl, ester, carboxylic acid moiety, and sulfonic acid moiety etc., according to necessity.

Moreover, as for X in the 1,2-diol structural unit of the formula (1), a single bond is the most preferable from the viewpoint of thermal stability and stabilities under the condition of high temperature or acid. X may be a linking chain within the range where the effect of the invention is not inhibited. Such linking chain includes hydrocarbons such as alkylene, alkenylene, alkynylene, phenylene, naphthylene and so on (these hydrocarbons can be substituted with halogens such as fluorine, chlorine, bromine etc.), as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— etc., wherein each R represents independently any substituent, preferably hydrogen and an alkyl group, and m is a natural number. Among them, alkylene groups having 6 or less carbon atoms are preferred, methylene group or —CH$_2$OCH$_2$— is particularly preferred, from the viewpoint of stability in production and use thereof.

A method of producing a PVA resin employed in the invention is not limited, but preferable methods include: (i) a method of saponifying a copolymer of vinyl ester monomer and a monomer of the general formula (2); (ii) a method of saponifying and decarbonating a copolymer of vinyl ester monomer and a compound of the general formula (3); and (iii) a method of saponifying and deketalizing a copolymer of vinyl ester monomer and a compound of the general formula (4), and the like.

[formula 2]

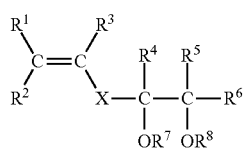

(2)

[formula 3]

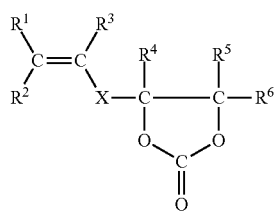

(3)

[formula 4]

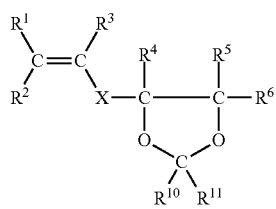

(4)

In the formulae (2), (3), and (4), any of R$^1$, R$^2$, R$^3$, X, R$^4$, R$^5$, and R$^6$ is ones as defined for the formula (1). Each of R$^7$ and R$^8$ is independently hydrogen or R$^9$—CO— (wherein R$^9$ is an alkyl group). Each of R$^{10}$ and R$^{11}$ is independently a hydrogen or an organic group.

Methods disclosed in JP2006-95825A may be employable for the methods (i), (ii) and (iii).

Among these methods, the method (i) with use of 3,4-diacyloxy-1-butene (particularly preferably 3,4-diacetoxy-1-butene) as a compound of the formula (2) is preferable, due to excellent copolymerization reactivity and industrial handling.

Concretely, where 3,4-diacetoxy-1-butene and vinyl acetate as a vinyl ester monomer are copolymerized, the monomer reactivity ratios are r(vinyl acetate)=0.710 and r(3, 4-diacetoxy-1-butene)=0.701. In the case that vinyl ethylene carbonate is used as a compound of the formula (3) in the method (ii), the monomer reactivity ratios are r (vinyl acetate)= 0.85 and r(vinyl ethylene carbonate)=5.4. By the comparison of these reactivities, 3,4-diacetoxy-1-butene is superior in copolymerization activity with vinyl acetate.

Also, the chain transfer constant of 3,4-diacetoxy-1-butene is Cx(3,4-diacetoxy-1-butene)=0.003(65° C.), which is lower than the chain transfer constant of vinyl ethylene carbonate (Cx(vinyl ethylene carbonate)=0.005(65° C.)) or the chain transfer constant of 2,2-dimethyl-4-vinyl-1,3-dioxolane used in the method (iii) (Cx(2,2-dimethyl-4-vinyl-1,3-dioxolane)= 0.023 (65° C.)). From this, it is understood that the 3,4-diacetoxy-1-butene could keep elevation of polymerization degree without hindrance and prevent decrease in the polymerization rate.

Furthermore, a byproduct generated by saponification of the copolymer containing 3,4-diacetoxy-1-butene unit is similar to one generated by saponification of polymers containing vinyl acetate unit. Since the vinyl acetate is frequently used as vinyl ester monomer, the method (i) does not require any special equipment or additional steps for post-treatment and/or recovering solvents. Therefore, conventional equipments can be used in the case of the method (i), which are important industrial advantages.

The 3,4-diacetoxy-1-butene can be produced by synthesizing with use of epoxy butene derivative, or by isomerizing 1,4-diacetoxy-1-butene, which is an intermediate product in production of 1,4-butane diol, in the presence of a metal catalyst such as palladium chloride. These methods are disclosed in e.g. WO00/24702, U.S. Pat. No. 5,623,086, U.S. Pat. No. 6,072,079 and so on.

Furthermore, a reagent grade 3,4-diacetoxy-1-butene is on sale from Across.

In the case that decarboxylation and deacetalization are not completed in the methods (ii) and (iii) respectively, carbonate ring and acetal ring are remained in a side chain of the respective produced PVA resins. The PVA resin may be crosslinked due to the ring-containing group, resulting in generation of gel-like matter in melt molding of the PVA resin.

From this point, the PVA resins produced by the method (i) are preferably used in the invention.

Examples of the vinyl ester monomers include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzonate, vinyl versatate, and so on, and vinyl acetate is preferably employed from the economic point.

Besides the above-mentioned monomers (vinyl ester monomers and compounds represented by the formulae (2), (3), and (4)), copolymerizable monomers may be copolymerized within the range where performance of the PVA resin is not importantly affected. The copolymerizable monomers include α-olefins such as ethylene and propylene; hydroxy group-containing α-olefin such as 3-buten-1-ol, 4-penten-1-ol, 5-hexene-1,2-diol or derivatives thereof such as acyl; unsaturated acids such as itaconic acid, maleic acid, and acrylic acid, or a salt thereof, mono- or di-alkyl ester thereof; nitriles such as acrylonitrile; amides such as methacryl amide, and diacetone acrylamide; olefin sulfonic acids such as ethylene sulfonic acid, allyl sulfonic acid, methallyl sulfonic acid, and AMPS, or a salt thereof, and so on.

The saponification degree of (A) PVA resin used in the invention is usually in the range of 80 to 100 mol %, particularly 85 to 99.9 mol %, further 88 to 99 mol %, which is measured according to JIS K6726. When the saponification degree is unduly low, melt viscosity behavior during melt molding is unstable, which becomes difficult in stable molding. Moreover, acetic acid odor is generated during molding, and the odor is sometimes left in the molded article, which result in lowering of gas barrier properties of a molded article.

The average polymerization degree of (A) PVA resin preferably used in the invention is in the range of usually 200 to 1800, particularly 300 to 1500, further 300 to 1000, which is measured based on JIS K6726.

Also, the melt flow rate (MFR) (210° C., load of 2160 g) of (A) PVA resin used in the invention is in the range of usually 0.5 to 50 g/10 min, particularly 3 to 20 g/10 min, further 5 to 10 g/10 min, which is measured with use of "Melt indexer F-801" manufactured by TOYO SEIKI Co., Ltd.

And, the melt viscosity (220° C., shear rate of 122 sec$^{-1}$) of (A) PVA resin used in the invention is in the range of usually 100 to 3000 Pa·s, particularly 300 to 2000 Pa·s, further 800 to 1500 Pa·s, which is measured by use of "Capillograph 1B" manufactured by TOYO SEIKI Co., Ltd.

When the average polymerization degree is too low, or when the MFR is too high, or when the melt viscosity is too low, the obtained molded article may lack in mechanical strength. On the contrary, when the average polymerization degree is too high, or when the MFR is too low, or when the melt viscosity is too high, moldability is sometimes deteriorated due to insufficient fluidity, which may cause to abnormally elevate the temperature of the resin by shear stress in molding, resulting in pyrolysis of the resin.

The content of 1,2-diol structural unit in (A) PVA resin used in the invention is usually from 1 to 15 mol %, particularly 2 to 10 mol %, further 3 to 9 mol %. When the content is unduly low, the melting point of the PVA resin is elevated up to near the pyrolysis point, which is easy to generate gel-like matter and fish eye or to scorch by pyrolysis in melt molding. Contrarily, when the content is unduly high, adhesion to metal is enhanced, and thereby fluidity is lowered in melt molding, and heat deterioration caused by stagnation is likely to occur.

The content of 1,2-diol structural unit in (A) PVA resin is calculated based on $^1$H-NMR spectrum (solvent: DMSO-d6, internal standard: tetramethylsilane) of completely saponified PVA resin, concretely, calculated from the area of the peaks derived from hydroxyl group proton, methyne proton, and methylene proton in 1,2-diol unit thereof, and methylene proton in main chain thereof, and proton in hydroxyl group linked to main chain thereof.

The wording "(A) a PVA resin" in the specification includes not only one species of PVA resin but also a mixture of two or more species of PVA resins. In the case of a mixture as (A) PVA resin, the mixture may contain unmodified PVA resins other than PVA resins listed above for (A) PVA resin, or various modified PVA resins. Also, in the case of a mixture of PVA resins, the PVA resins are preferably combined such that averages of polymerization degree, saponification degree, and content of 1,2-diol structural unit of the mixture fall in the ranges as mentioned above respectively.

[(B) Mixture of Block Copolymers]

Next, (B) a mixture of block copolymers used in the invention will be explained.

(B) a combination of block copolymers contained in the inventive resin composition is constituted of block copolymers each containing a block of aromatic vinyl polymer (i.e. aromatic vinyl polymer block), and at least one of blocks of conjugated diene polymer (i.e. conjugated diene polymer block) and hydrogenated conjugated diene polymer block. And the mixture (B) includes (B1) a block copolymer having no carboxyl group and (B2) a block copolymer containing a carboxyl group.

<(B1) Block Copolymer Having No Carboxyl Group>

(B1) a block copolymer having no carboxyl group is served as a thermoplastic elastomer wherein the aromatic vinyl polymer block can act as hard segment and the conjugated diene polymer block and/or hydrogenated thereof can act as soft segment. The block copolymer (B1) may be di-block copolymer X-Y, tri-block copolymer X-Y-X or Y-X-Y, and multi-block copolymer in which Xs and Ys are linked alternately etc., wherein X represents the aromatic vinyl polymer block and Y represents the conjugated diene polymer block and/or hydrogenated thereof. Furthermore, the block copolymer may have molecular configuration such as linear chain, branched chain, or star form etc. Particularly, a linear tri-block copolymer represented by X-Y-X is preferable from the viewpoint of mechanical properties.

Constituent monomers of the aromatic vinyl polymer block include styrene; alkyl styrenes such as α-methyl styrene, β-methyl styrene, o-methyl styrene, m-methyl styrene, p-methyl styrene, t-butyl styrene, 2,4-dimethyl styrene, and 2,4,6-trimethyl styrene; halogenated styrene such as monofluoro styrene, difluoro styrene, monochloro styrene, dichloro styrene, and methoxy styrene; vinyl compounds having aromatic ring other than benzene such as vinyl naphthalene, vinyl anthracene, indene, aceto naphthylene and derivative thereof. The aromatic vinyl polymer block may be composed of homopolymer of the aforementioned monomer or copolymer of plural of aforementioned monomers, however, a styrene homopolymer block is preferably used.

The aromatic vinyl polymer block may contain other comonomers, for instance, olefins (e.g. butene, pentene, hexene etc.), diene compounds (e.g. butadiene, isoprene etc.), vinyl ether compounds (e.g. methyl vinyl ether, allyl ether compound etc.), in addition to aromatic vinyl compound, within the range where the effect of the invention is not inhibited, normally, in the range of preferably 10 mol % or less to the aromatic vinyl polymer block.

The aromatic vinyl polymer block contained in (B1) block copolymer has usually a weight-average molecular weight between 10,000 and 300,000, particularly between 20,000 and 200,000, further between 50,000 and 100,000.

Examples of constituent monomers of the conjugated diene polymer block and/or hydrogenated thereof are 1,3-butadiene, isoprene (i.e. 2-methyl-1,3-butadiene), 2,3-dimethyl-1,3-butadiene, 1,3-pentadiene and the like. These monomers may be used alone or in combination of plural of them. In particular, homopolymer or copolymer block of isoprene and/or butadiene is preferred, and butadiene homopolymer block is particularly preferred.

The polymerization of conjugated diene compound may proceed by plural bonding types. For example, in the case of butadiene, two types of butadiene units are producible, that is, butadiene unit (—CH$_2$—CH(CH=CH$_2$)—) produced by 1,2-bonding and butadiene unit (—CH$_2$—CH=CH—CH$_2$—) produced by 1,4-bonding. The production ratio of these is not determined because it is varied on kinds of conjugated diene compound. Normally, in the case of butadiene, the production percentage of the 1,2-bonding unit is from 20 to 80 mol %.

A part or all of double bonds remained in the structural units derived from the conjugated diene compound in the block copolymer are hydrogenated to provide the hydrogenated block copolymer with improved thermal resistance and/or weather resistance, as well as the resin composition containing the hydrogenated block copolymer and a molded article thereof with improved thermal resistance and/or weather resistance. The hydrogenated percentage is preferably in the range of 50 mol % or more, and particularly 70 mol % or more.

The butadiene unit produced by 1,2-bonding converts to butylene unit (—CH$_2$—CH(CH$_2$—CH$_3$)—) by hydrogenation, and the butadiene unit produced by 1,4-bonding converts to linked ethylene unit (—CH$_2$—CH$_2$—CH$_2$—CH$_2$—) by hydrogenation, the former conversion is normally occurred prior to the latter.

The conjugated diene polymer block and/or hydrogenated thereof may contain comonomers other than conjugated diene compound, within the range where the effect of the invention is not inhibited. For instance, the comonomers include aromatic vinyl compounds (e.g. styrene), olefins (e.g. butene, pentene, hexene, etc.), vinyl ether compounds (methyl vinyl ether, etc.), allyl ether compound and so on. Such comonomers may be copolymerized in the range of 10 mol % or less per the conjugated diene polymer block.

It is preferred that the conjugated diene polymer block and/or hydrogenated thereof in (B1) block copolymer has a weight-average molecular weight of usually 10,000 to 300,000, particularly 20,000 to 200,000, further 50,000 to 100,000.

A small amount of a compound having a functional group other than carboxyl group may be copolymerized in the aromatic vinyl polymer block and/or conjugated diene polymer block, and the block copolymer having the functional group is also included in the scope of the invention. Examples of the functional groups are polar groups such as amide, amino, hydroxyl group, and epoxy. Since such functional groups may exert some effects to the compatibility between (B1) block copolymer and (B2) block copolymer, and furthermore, exert to the affinity of these copolymers for (A) polyvinyl alcohol, it is not preferable that (B1) block copolymer contains the comonomer having such functional groups. That is, the preferable block copolymer (B1) is not modified with a polar group-containing compound, in other words, unmodified block copolymer is preferred for the block copolymer (B1).

The weight ratio of the contents of the aromatic vinyl polymer block to the conjugated diene polymer block and/or hydrogenated thereof in the block copolymer (B1) used in the invention is in the range of usually 10/90 to 70/30, particularly 20/80 to 50/50. When the content of the aromatic vinyl polymer block is unduly high or unduly low, a balance between flexibility and thermoplasticity of (B1) block copolymer might be disturbed, as a result, the advantageous effect of the invention may not be given to a resin composition and a molded article thereof.

According to the invention, the preferable block copolymer (B1) has a weight-average molecular weight of usually 50,000 to 500,000, particularly 120,000 to 450,000, further 150,000 to 400,000.

Furthermore, the preferable block copolymer (B1) may have a melt viscosity (220° C., shear rate of 122 sec$^{-1}$) of usually 100 to 3000 Pa·s, particularly 300 to 2000 Pa·s, further 800 to 1500 Pa·s.

When the weight-average molecular weight is too large or when the melt viscosity is too high, workability in melt-kneading with (A) PVA resin, or dispersibility in (A) PVA resin may be lowered. Contrarily when the weight-average molecular weight is too small or when the melt viscosity is too low, mechanical strength of (B1) block copolymer itself is decreased, which may cause to adversely affect on the inventive resin composition and the molded article thereof.

The weight-average molecular weight of (B1) block copolymer is a value measured by GPC and calculated using polystyrene as a standard.

(B1) a block copolymer is obtainable by linking aromatic vinyl polymer block and conjugated diene polymer block, and if necessary, the obtained block is hydrogenated to obtain hydrogenated block copolymer in which double bonds of the conjugated diene polymer block are hydrogenated.

The block copolymer having aromatic vinyl polymer block and conjugated diene polymer block may be produced by known methods, for example, a method where aromatic vinyl compound and conjugated diene compound are copolymerized in the presence of an initiator such as alkyl lithium compound in inert organic solvent by consecutive polymerization.

Also, the obtained block copolymer of aromatic vinyl polymer block and conjugated diene polymer block can be hydrogenated by known hydrogenation methods, for example, a method where the block copolymer is reduced with a reducing agent such as boron hydride, or a method where the block copolymer is hydride reduced with a metal catalyst such as platinum, palladium, Raney nickel and so on.

Examples of (B1) block copolymer having a structure described above are styrene/butadiene block copolymer (SBS) made from styrene and butadiene, styrene/butadiene/butylene block copolymer (SBBS) obtained by hydrogenating side chain double bond of butadiene unit in SBS, styrene/ethylene/butylene block copolymer (SEBS) obtained by further hydrogenating main chain double bond in SBBS, styrene/isoprene block copolymer (SIS) made from styrene and isoprene, and so on. Of these, SEBS is preferably used due to its superior thermal stability and weather resistance.

A commercially available block copolymer, for example, "TUFPRENE™", "ASAPRENE T", and "ASAFLEX™" available SBS from Asahi Kasei Corporation, "TAFTEC P series" available SBBS from Asahi Kasei Corporation, and "TAFTEC H series" available SEBS from Asahi Kasei Corporation, may be employed as (B1) block copolymer.

Another examples include "KRATON G", "KRATON D", and "CARIFLEX TR" available from Shell in Japan; "SEPTON™" and "HYBRAR" available from Kuraray Co.; "DYNARON®", "JSR-TR", and "JSR-SIS" available from JSR Corporation; "QUINTAC®" available from Zeon Corporation; "DENKA STR" available from Denki Kagaku Kogyo Kabushiki Kaisha; and so on.

<(B2) Carboxyl Group-Containing Block Copolymer>

(B2) a block copolymer contains carboxyl group in side chain thereof, and is obtainable by modifying a block copolymer with carboxyl group-containing compound, wherein the block copolymer contains aromatic vinyl polymer block as hard segment and conjugated diene polymer block and/or hydrogenated thereof as soft segment.

The method of modifying with carboxyl group-containing compound is not particularly limited, and known modification methods may be employable. Preferably, for example, such modification is conducted by adding $\alpha,\beta$-unsaturated carboxylic acid or its derivative to a block copolymer containing aromatic vinyl polymer block and conjugated diene polymer block and/or hydrogenated thereof. Such addition is performed by known methods, for example, by a radical reaction in solution in the presence or absence of radical initiator, and by melt-kneading in extruder.

Examples of the $\alpha,\beta$-unsaturated carboxylic acid or its derivative used for introduction of carboxyl group, are $\alpha,\beta$-unsaturated monocarboxylic acids such as acrylic acid and methacrylic acid; $\alpha,\beta$-unsaturated dicarboxylic acids such as maleic acid, succinic acid, itaconic acid, and phthalic acid; $\alpha,\beta$-unsaturated monocarboxylic acid esters such as glycidyl acrylate, glycidyl methacrylate, hydroxylethyl acrylate, and hydroxylmethyl methacrylate; $\alpha,\beta$-unsaturated dicarboxylic acid anhydrides such as maleic acid anhydride, succinic acid anhydride, itaconic acid anhydride, phthalic acid anhydride, and the like.

The content of carboxyl group in (B2) block copolymer, as referred to as acid value measured by titration method, is in the range of usually 0.5 to 20 mg $CH_3ONa/g$, preferably 1 to 10 mg $CH_3ONa/g$, more preferably 1.5 to 8 mg $CH_3ONa/g$, particularly preferably 2 to 5 mg $CH_3ONa/g$.

Each carboxyl group contained in (B2) block copolymer can form a hydrogen bond to or ester linkage with a hydroxyl group contained in (A) polyvinyl alcohol resin having 1,2-diol unit in its side chain. This may improve interface-adhesion between (A) polyvinyl alcohol resin and (B) mixture of block copolymers that act as thermoplastic elastomer. Accordingly, a stress applied to (A) polyvinyl alcohol resin can be transmitted to (B) mixture of block copolymers effectively, and furthermore, (A) PVA resin can form a matrix with improved continuity, thereby, presumably suppressing gas barrier decline resulting from the blend with (B) block copolymers. Therefore, when the acid value of (B2) block copolymer is excessively low, interface-adhesion between (B) mixture of block copolymers and (A) PVA resins is not sufficiently improved by the carboxyl group. On the contrary, when the acid value is excessively high, the interface-adhesion between (A) polyvinyl alcohol resin and (B2) block copolymer becomes too strong, and thus, (B1) block copolymer and (B2) block copolymer cannot be kneaded and mixed homogeneously. Furthermore, (B) combination of block copolymers tends to be difficult to be finely dispersed in a matrix of (A) polyvinyl alcohol resin. As a result, sufficient flex resistance improvement cannot be obtained.

As for constituent blocks (i.e. aromatic vinyl polymer block, conjugated diene polymer block and hydrogenated thereof) of (B2) block copolymer, as well as the configuration of the blocks, those exemplified for (B1) block copolymer may be employed. The constituents and configuration of (B2) block copolymer may be identical or different from those of (B1) block copolymer.

The aromatic vinyl polymer block in (B2) block copolymer has a weight-average molecular weight selected from the similar range for (B1) block copolymer (i.e. usually from 10,000 to 300,000, particularly 20,000 to 200,000, further 50,000 to 100,000). Also, the conjugated diene polymer block and/or hydrogenated thereof in (B2) block copolymer has a weight-average molecular weight selected from the similar range for (B1) block copolymer (i.e. usually from 10,000 to 300,000, particularly 20,000 to 200,000, further 50,000 to 100,000).

The weight ratio of the contents of the aromatic vinyl polymer block to the conjugated diene polymer block and/or hydrogenated thereof in (B2) block copolymer is preferably selected from usually 10/90 to 70/30, particularly 20/80 to 50/50, for the same reasons as (B1) block copolymer.

(B2) a block copolymer may contain another functional group (for example, polar groups such as amide, amino, hydroxyl, epoxy etc.) in addition to carboxyl group in the aromatic vinyl polymer block and/or conjugated diene polymer block, in a small amount such that the functional group does not affect on carboxyl group.

According to the invention, the preferable block copolymer (B2) has a weight-average molecular weight of usually 50,000 to 500,000, particularly 120,000 to 450,000, further 150,000 to 400,000.

Also, the preferable block copolymer (B2) has a melt viscosity (220° C., shear rate of 122 sec') of usually 100 to 3000 Pa·s, particularly 300 to 2000 Pa·s, further 800 to 1500 Pa·s.

As similar to (B1) block copolymer, when the weight-average molecular weight is too large, or when the melt viscosity is too high, the workability in melt-kneading with (A) PVA resin and dispersibility in (A) PVA resin may be lowered. To the contrary, when the weight-average molecular weight is too small or when melt viscosity is too low, the mechanical strength of (B2) block copolymer is lowered, which may adversely affect on properties of the resin composition of the invention, as well as the molded article thereof.

Examples of (B2) block copolymer having structure described above include a block copolymer obtainable by introducing carboxyl group to a block copolymer used for (B1) block copolymer such as styrene/butadiene block copolymer (SBS), styrene/butadiene/butylene block copolymer (SBBS), styrene/ethylene/butylene block copolymer (SEBS), and styrene/isoprene block copolymer (SIS)). The basic skeleton of (B2) block copolymer may be identical to or different from that of (B1) block copolymer. Preferably, the basic skeleton of (B1) and (B2) block copolymers are identical in view of compatibility between them.

As (B2) block copolymer, commercially available block copolymers, for instance, "TUFTEC™ M Series" which is a carboxyl group-modified SBS from Asahi Kasei Corporation, "f-DYNARON®" from JSR Corporation, and "KRATON®" from Shell in Japan, may be used.

<Combination of (B1) Block Copolymer and (B2) Block Copolymer>

The weight ratio (B1/B2) of the contents of (B1) block copolymer to (B2) block copolymer in (B) a mixture of block copolymers is preferably selected from the range of usually 10/90 to 90/10, particularly 30/70 to 70/30, further 40/60 to 60/40.

(B1) a block copolymer having no carboxyl groups does not have affinity for (A) polyvinyl alcohol resin. Therefore, when (B1) block copolymer is solely used as thermoplastic elastomer, (A) polyvinyl alcohol resin and (B1) block copolymer are separated each other, and thus, cannot form a sea-island structure. As a result, flex resistance improvement cannot be obtained. Furthermore, the existence of (B1) block copolymer impairs gas barrier properties of the polyvinyl alcohol resin. On the other hand, (B2) block copolymer having carboxyl groups has strong affinity for (A) polyvinyl alcohol resin. Therefore, when (B2) block copolymer is solely employed as thermoplastic elastomer and blended with the polyvinyl alcohol resin (A), the carboxyl group contained in (B2) block copolymer binds to (A) polyvinyl alcohol resin at the interface in an early stage of the blend of these resins. For this reason, or possible other reasons, the block copolymer (B2) is difficult to be finely dispersed, and cannot form minute islands. As a result, flex resistance improvement would be insufficient. Furthermore, gas barrier properties of the polyvinyl alcohol resin tend to be impaired. Accordingly, (B1) block copolymer and (B2) block copolymer should be preferably blended approximately in an equal ratio, although the ratio would be varied according to the acid value of the block copolymer (B2).

The melt viscosity ratio ($\eta_{B1}/\eta_{B2}$) of (B1) block copolymer to (B2) block copolymer is selected from the range of usually 1/10 to 10/1 under the condition of shear rate of 122 $sec^{-1}$ at 220° C. In both cases of too large and small melt viscosity ratio, dispersibility of (B) mixture of block copolymers in (A) PVA resin tends to be lowered.

Further, an acid value of (B) mixture of (B1) block copolymer and (B2) block copolymer is in the range of 0.2 to 10 mg $CH_3ONa/g$, preferably 0.5 to 5 mg $CH_3ONa/g$, further preferably 1 to 3 mg $CH_3ONa/g$.

In both cases of too high and low acid value, there is a tendency to be difficult to form a sea-island structure, in which (B) mixture of block copolymers forms islands and (A) polyvinyl alcohol resin forms the sea of matrix resin, such that the (B) mixture of block copolymers is almost homogeneously dispersed as minute islands each having a domain radius less than 4 μm.

[Resin Composition]

The polyvinyl alcohol resin composition of the invention comprises (A) a PVA resin, (B1) a block copolymer having no carboxyl group, and (B2) a block copolymer modified with carboxyl group, as described above.

The content weight ratio (A/B) of (A) PVA resin to (B) mixture of block copolymers in the resin composition is preferably selected from the range of usually 98/2 to 60/40, particularly 95/5 to 65/35, further 85/15 to 75/25. When the content ratio is too large, a molded article thereof may not have sufficient flex crack resistance. Contrarily, when the content ratio is too small, gas barrier properties tends to be insufficient.

The ratio ($\eta_A/\eta_B$) of melt viscosities (220° C., shear rate of 122 sec$^{-1}$) of (A) PVA resin to (B) mixture of block copolymers in the resin composition of the invention is preferably selected from the range of usually 1/5 to 5/1, particularly 1/3 to 3/1, further 1/2 to 2/1. In both cases of too large and small melt viscosity ratio, it may be difficult in homogeneously melt-kneading. That is, it is preferred that (A) PVA resin and (B) mixture of block copolymers have closer melt viscosities each other.

In addition to (A) PVA resin and (B) mixture of block copolymers, the resin composition of the invention may contain other polymers within the range where the effect of the invention is not inhibited. Examples of other polymers include various thermoplastic resins such as polyamide, polyester, polyethylene, polypropylene, polystyrene, and so on.

Moreover, the inventive resin composition may contain, according to necessity, reinforcing agent, filler, plasticizer, pigment, dye, slipping agent, antioxidant, antistatic agent, ultraviolet absorber, thermal stabilizer, light stabilizer, surfactant, insecticide, antistatic agent, drying agent, antiblocking agent, fire retardant, crosslinking agent, curing agent, blowing agent, crystal forming agent, and other thermoplastic resins, within the range where the effect of the invention is not inhibited.

A method for preparation of the polyvinyl alcohol resin composition of the invention is not particularly limited. The inventive resin composition can be prepared by one of the following methods (i) to (iv):
(i) preparing (B) a mixture of block copolymers by mixing (B1) a block copolymer and (B2) a block copolymer, and then adding the resultant mixture (B) to (A) a polyvinyl alcohol resin;
(ii) simultaneously blending (A) a polyvinyl alcohol resin, (B1) a block copolymer, and (B2) a block copolymer, and mixing;
(iii) mixing a part of (B1) block copolymer and a part of (B2) block copolymer in advance, and then mixing simultaneously the resultant mixture, (A) polyvinyl alcohol, and the remained block copolymers (B1) and (B2); and
(iv) mixing a part of (A) polyvinyl alcohol resin with block copolymer (B1) or (B2), and then adding the other block copolymer (B2) or (B1), followed by mixing. Of these methods, a preferable method is the method (ii) in which all polymers are simultaneously blended.

A method and apparatus for mixing polymers is not particularly limited, but a melt-kneading method is normally employed. Kneading machine, extruder, mixing roll, banbury mixer, and kneader may be used as a melt-kneading apparatus, and extruder is preferably used because continuous mixing can be conducted with high efficiency by use of the extruder.

Conditions of melt-kneading for preparation of the inventive resin composition with an extruder are appropriately selected according to type of (A) PVA resin including melting point thereof. Normally, the temperature in melt-kneading is usually selected from the range between 160 and 220° C.

Thus prepared resin composition of the invention is usually obtained in the form of pellets or microparticles used for a molding material. Particularly, pellets of the resin composition are preferable, because pellets can be charged to molding machines with only a slight problem about occurrence of fine powder, which is good handling.

The resin composition can be formed into pellets by known methods, however, the pellets are effectively obtained by extruding the resin composition in a strand state from the extruder, and cooling, after then cutting the strand in a certain length to obtain the cylindrical pellets.

[Molded Article]

The resin composition of the invention is suitable for molding material due to excellent moldability, particularly melt moldability. The resin composition is melt-molded by known molding methods such as extrusion, blown extrusion, injection molding, blow molding, vacuum forming, pressure forming, compression molding, calendar molding, or the like.

Moreover, the resin composition of the invention can be formed into various shaped molded articles such as film, sheet, pipe, plate, ring, bag, bottle, fabric, and so on.

Moreover, the resin composition may be used for a layer thereof combined to the layer of other material to form a multilayer structure.

In the case of the multilayer structure, it is particularly preferred that the multilayer structure has a surface layer of a material having high humidity barrier properties for the following reason. The resin composition has excellent gas barrier properties under low humidity condition due to PVA resin as a main component thereof, but the gas barrier properties may be strongly influenced by humidity absorption of the PVA resin.

The material having superior humidity barrier properties are thermoplastic resins including, typically, polyolefin-based resins (e.g. low density polyethylene, middle density polyethylene, high density polyethylene, ethylene-vinyl acetate copolymer, ethylene-propylene copolymer, polypropylene etc.), polyester resins (e.g. polyethylene terephthalate, polybutylene terephthalate), vinyl chloride resins (e.g. polyvinyl chloride, polyvinylidene chloride), polyamide resins (e.g. nylon); thermosetting resins such as epoxy resin, phenol resin etc.; metal, and deposited metallic films. These materials may be selected according to applications or desired properties.

In the multilayer structure, an adhesive layer may be interposed between the layer of the inventive resin composition and the layer of other materials. The adhesive used for the adhesive layer includes modified olefin-based polymers having carboxyl group such as maleic anhydride-modified polyethylene, maleic anhydride-modified polypropylene, and maleic anhydride-modified ethylene-vinyl acetate copolymer.

Such multilayer structures can be produced by various methods. For instance, a multilayer structure laminated on thermoplastic resin layer can be produced by a method of coextrusion or coinjection; a method of extrusion coating; and a method of laminating layers each produced in advance. An appropriate method may be selected according to desired shape and/or thickness and so on.

A molded article of the resin composition of the present invention has excellent barrier properties that may satisfy requirements in various fields of art. Furthermore, it has excellent flexibility and flex crack resistance. Thus, it can be used for articles, with which the above-mentioned characteristics are required. Examples of the use of the article may include: packaging materials for foods and drinks, containers, inner bags for bag in box-type containers, gaskets for containers, infusion solution bags for medical use, containers for organic liquids, pipes for organic liquid transmission, containers for various gases, tubes, hoses, and the like.

Furthermore, it can be also used for various electrical parts, automobile parts, industrial components, leisure goods, sporting goods, articles for daily use, toys, medical equipments, and the like.

EXAMPLE

Hereinafter, the present invention is described specifically with reference to Examples, but the invention is not limited to the description unless exceeding its gist.

Incidentally, "parts" and "%" in the Examples are on the weight basis, unless otherwise indicated.

[(A) PVA Resin]

(1) Preparation of PVA Resin (PVA1)

Sixty-eight parts of vinyl acetate, 23.8 parts of methanol, and 8.2 parts of 3,4-diacetoxy-1-butene were placed in a reaction vessel equipped with a reflux condenser, dripping funnel, and a stirrer. Then, 0.3 mol % (mol % based on the amount of employed vinyl acetate) of azobisisobutyronitrile was added, and the temperature was raised with stirring the mixture under nitrogen gas stream, thus, initiating polymerization. When polymerization degree of vinyl acetate became 90%, m-dinitrobenzene was added to this vessel, rendering the polymerization to be concluded. Then, unreacted vinyl acetate monomer was removed from the reaction system by blowing methanol vapor into the mixture, thus, obtaining methanol solution containing the resultant copolymer.

Next, the methanol solution was further diluted with methanol to adjust the concentration to 45%. Thus obtained solution was provided in a kneader, and methanol solution containing 2% sodium hydroxide was added to the kneader, while keeping the temperature of the reaction mixture at 35° C. so as to proceed saponification. In this process, the methanol solution containing 2% sodium hydroxide was added so that the amount of sodium hydroxide was 10.5 milli-mole with respect to 1 mol of the total amount of vinyl acetate structural unit and 3,4-diacetoxy-1-butene structural unit in the copolymer. As the saponification proceeds, a saponification product was precipitated. When the product became in the form of particles, the product was separated. The obtained product was washed thoroughly with methanol, dried with hot air, and thus, PVA resin (PVA1) was obtained.

Saponification degree of thus obtained PVA resin (PVA1) was determined from the residual amount of vinyl acetate unit and the consumed amount of alkali required for hydrolysis of the 3,4-diacetoxy-1-butene structural unit. The saponification degree was 98.9 mol %. The average degree of polymerization was 450, which was determined according to the method of JIS K 6726. The content of 1,2-diol structural unit shown by formula (1) was 6 mol %, which was calculated from the integral value obtained by $^1$H-NMR (300 MHz, proton NMR, d6-DMSO, internal standard: tetramethylsilane, 50° C.). The MFR (210° C., load: 2160 g) was 5.5 g/10 min, and the melt viscosity (220° C., shear rate: 122 sec$^{-1}$) was 1040 Pa·s.

(2) Preparation of PVA Resin (PVA2)

68.5 parts of vinyl acetate, 20.5 parts of methanol, and 11.0 parts of 3,4-diacetoxy-1-butene were placed in a reaction vessel equipped with a reflux condenser, dripping funnel, and a stirrer, in such a manner that 10% of the vinyl acetate was charged at initiation, and then 3,4-diacetoxy-1-butene and the residue of the vinyl acetate were added dropwise at constant rate for 9 hours. Also, 0.3 mol % (mol % based on the amount of employed vinyl acetate) of azobisisobutyronitrile was placed in the reaction vessel, and the temperature was raised with stirring the mixture under nitrogen gas stream, thus, initiating polymerization. When the polymerization degree of the vinyl acetate became 90%, m-dinitrobenzene was added to this vessel, rendering the polymerization to be concluded. Then, unreacted vinyl acetate monomer was removed from the reaction system by blowing methanol vapor into the mixture, and thus, methanol solution containing the resultant copolymer was obtained.

The obtained methanol solution was used to prepare PVA resin (PVA2) having properties shown in Table 1 in the same manner as the PVA resin (PVA1).

(3) Preparation of PVA Resin (PVA3)

72.1 parts of vinyl acetate, 21.6 parts of methanol, and 6.3 parts of 3,4-diacetoxy-1-butene were placed in a reaction vessel equipped with a reflux condenser, dripping funnel, and a stirrer, in such a manner that 40% of the vinyl acetate was charged at initiation, and then 3,4-diacetoxy-1-butene and the residue of the vinyl acetate were added dropwise at constant rate for 8 hours. Also, 0.16 mol % (mol % based on the amount of employed vinyl acetate) of azobisisobutyronitrile was placed in the reaction vessel, and the temperature was raised with stirring the mixture under nitrogen gas stream, thus, initiating polymerization. When polymerization degree of vinyl acetate became 90%, m-dinitrobenzene was added to this vessel, rendering the polymerization to be concluded. Then, unreacted vinyl acetate monomer was removed from the reaction system by blowing methanol vapor into the mixture, and thus, methanol solution containing the resultant copolymer was obtained.

Next, the methanol solution was further diluted with methanol to adjust the concentration to 55%. Thus obtained solution was provided in a kneader, and methanol solution containing 2% sodium hydroxide was added to the kneader, while keeping the temperature of the reaction mixture at 35° C. so as to proceed saponification. In this process, the methanol solution containing 2% sodium hydroxide was added so that the amount of sodium hydroxide was 12.5 milli-mole with respect to 1 mol of the total amount of vinyl acetate structural unit and 3,4-diacetoxy-1-butene structural unit in the copolymer. As the saponification proceeded, a saponification product was precipitated. When the product became in the form of particles, the product was separated. The obtained product was washed thoroughly with methanol, dried with hot air, and thus, PVA resin (PVA3) having properties shown in Table 1 was obtained.

| Component (A) (PVA) | PVA1 | PVA2 | PVA3 |
|---|---|---|---|
| average polymerization degree | 450 | 300 | 450 |
| saponification degree (mol %) | 98.9 | 98.9 | 98.9 |
| 1,2-diol content (mol %) | 6 | 8 | 4.5 |
| MFR(g/10 min) (condition: 210° C., load of 2160 g) | 5.5 | 28 | 3.5 |
| melt viscosity (Pa·s) (220° C., shear rate: 122 sec$^{-1}$) | 1040 | 274 | 1150 |

[(B) Combination of Block Copolymers]

Two types of styrene/ethylene/butylene block copolymer (SEBS) (manufactured by Asahi Kasei Corporation) (B1-1 and B1-2) shown in Table 2 were employed for the block copolymer (B1), and two types of styrene/ethylene/butylene block copolymer (SEBS) (manufactured by Asahi Kasei Corporation) (B2-1 and B2-2) shown in Table 2 were employed for the carboxyl group-modified block copolymer (B2).

TABLE 2

| Component (B) | B1 | | B2 | |
|---|---|---|---|---|
| (block copolymer) | B1-1 | B1-2 | B2-1 | B2-2 |
| kind (trade name) | TUFTEC H1041 | TUFTEC H1141 | TUFTEC M1911 | TUFTEC M1913 |
| melt viscosity (Pa · s) | 1160 | 138 | 1317 | 1060 |
| acid value (mgCH$_3$ONa/g) | — | — | 2 | 10 |

Preparation of Polyvinyl Alcohol Resin Composition

Examples 1-5

PVA resin (PVA1, PVA2, or PVA3), block copolymers B1 (B1-1 or B1-2) and B2 (B2-1 or B2-2) were mixed in the respective amount shown in Table 3, and dry blended. The obtained mixture was fed to a twin screw extruder and melt-kneaded in the following condition, and subsequently, extruded in a strand form and the strand was cut by a pelletizer to obtain cylindrical pellets of the resin composition.

diameter (D) 15 mm, $L/D=60$ rotation number of screw: 200 rpm
set temperature: C1/C2/C3/C4/C5/C6/D=90/205/210/210/210/215/220/220/220° C.
output: 1.5 kg/hr Each of the obtained resin compositions has melt viscosity ratio (A/B) shown in Table 3. The melt viscosity of the component (B) was a measurement value (220° C., shear rate of 122 sec$^{-1}$) of the component (B), which is a mixture of (B1) and (B2) at a weight ratio shown in Table 3. The acid value of the component (B) was calculated with taking consideration of the weight ratio of (B1) and (B2).

[Production of Molded Article]

Resin composition pellets prepared above were formed into single layer film having a thickness of 30 μm by use of an extruder under the following condition, and evaluated as described below. The evaluation results were summarized in Table 3.

diameter (D) 15 mm $L/D=60$

Rotation number of screw: 200 rpm
set temperature: C1/C2/C3/C4/C5/C6/D=90/205/210/210/210/215/220/220/220° C.
output: 1.5 kg/hr
die: width 300 mm, coat hanger type
drawn speed: 2.6 m/min
roll temperature: 50° C.
air gap: 1 cm

[Evaluation]

(1) Oxygen Permeability

The oxygen permeability was measured by Oxtran2/20 of MOCON at 23° C. and 65% RH.

(2) Flex Crack Resistance

A flex crack test was conducted using GELBO FLEX TESTER (produced by Rigakukogyo-sha) under the condition of 23° C. and 50% RH. A single layer film was set in the tester, and driven to move in the horizontal direction by 25 inches. Then, at a point of 3.5 inches, torsion stress of 440° was applied for 100 times (40 cycles/min). Then, the number of pinholes formed in an area of 28 cm×17 cm located at the center portion of the film was counted. The above-mentioned test was repeated 5 times, and the average value of the pinhole number was calculated.

(3) Morphology

A single layer film was immersed in xylene at 60° C., subjected to an ultrasonic treatment, and etching was conducted thereto. The resultant film was observed by scanning electron microscopy (SEM), and the dispersion of domain holes resulted from (B) block copolymers was visually observed. The film was evaluated according to the following criteria.

◯: The maximum diameter of the domain was less than 4 μm.

Δ: The maximum diameter of the domain was 4 to 10 μm.

x: The maximum diameter of the domain exceeded 10 μm.

Comparative Examples 1 and 2

The resin composition of Comparative Example 1 was prepared in the same manner as Example 1 except that the amount of the block copolymer (B1) was changed to 20 parts by weight, and block copolymer (B2) was not added. The resin composition of Comparative Example 2 was prepared in the same manner as Example 1 except that the block copolymer (B1) was not added and the amount of the block copolymer (B2) was changed to 20 parts by weight. Each prepared resin composition was formed into a molded article and evaluated in the same manner as Examples. The evaluation results are summarized in Table 3.

TABLE 3

| | | | | Example | | | | | Comparative Example | |
|---|---|---|---|---|---|---|---|---|---|---|
| No. | | | | 1 | 2 | 3 | 4 | 5 | 1 | 2 |
| Composition | A | | | PVA1 | PVA1 | PVA1 | PVA2 | PVA3 | PVA1 | PVA1 |
| | B | B1 | | B1-1 | B1-1 | B1-2 | B1-1 | B1-1 | B1-1 | — |
| | | B2 | | B2-1 | B2-2 | B2-2 | B2-1 | B2-1 | — | B2-1 |
| | | content ratio (B1/B2) | | 10/10 | 10/10 | 10/10 | 15/15 | 5/5 | 10/0 | 0/10 |
| | | melt viscosity (B1 + B2) | | 1121 | 1100 | 370 | 1121 | 1121 | 1160 | 1060 |
| | | acid value (mgCH$_3$ONa/g) | | 1 | 5 | 5 | 1 | 1 | — | 2 |
| | A/B | content weight ratio | | 80/20 | 80/20 | 80/20 | 70/30 | 90/10 | 80/20 | 80/20 |
| | | melt viscosity ratio | | 1/1.1 | 1/1.1 | 2.8/1 | 1/4.1 | 1/1.1 | 1/1.1 | 1/1.0 |
| Evaluation | | morphology | | ◯ | ◯ | ◯ | ◯ | ◯ | x | Δ |
| | | flex crack resistance (pinhole number) | | 11 | 42 | 45 | 7 | 23 | 185 | 75 |
| | | oxygen permeation (cc · 30 μm/m$^2$/day) | | 0.3 | 0.5 | 0.5 | 2.5 | 0.2 | 10 | 6.8 |

As seen from Table 3, Comparative Example 1, in which the thermoplastic elastomer is only (B1) block copolymer having no carboxyl group, was lowered in flex crack resistance and gas barrier properties due to insufficient dispersion state of the block copolymer (B1). The Comparative Example 2, in which the thermoplastic elastomer is only carboxyl group-containing block copolymer (B2), had improved flex crack resistance and gas barrier properties as compared with those of Comparative Example 1, however, the improved level was not satisfied.

On the other hand, Examples which contained (B1) block copolymer having no carboxyl group and (B2) carboxyl group-containing block copolymer as thermoplastic elastomer, exhibited superior flex crack resistance and oxygen barrier properties because both block copolymers could be finely dispersed in the PVA resin (A).

From comparison between Examples 1, 4, and 5, when types of (A) PVA resin, (B1) block copolymer, and (B2) carboxyl group-containing block copolymer are identical each other, it is understood that flex crack resistance and gas barrier properties might depend on the content ratio between (A) PVA resin and (B) mixture of block copolymers.

In addition, from comparison between Example 1 and Example 2, in the case that an acid value of the (B) mixture of block copolymers is increased, flex crack resistance tends to lower, it is supposed that the (B2) carboxyl group-containing block copolymer binds to the (A) PVA resin too strongly to attenuate flex energy associated to fatigue as elastomer, which resulting in deterioration of flex crack resistance. The larger difference of melt viscosity between (A) PVA resin and (B) mixture of block copolymers, the larger the deterioration (see Example 3).

INDUSTRIAL APPLICABILITY

A molded article produced by melt molding the resin composition of the invention has superior gas barrier properties and flex crack resistance. Accordingly, the molded article is suitable for film, sheet, and container for wrapping products, e.g., food and pharmaceutical preparations, which are required to prevent from deterioration due to oxidation. In addition, the molded article is suitable for container, tube, and hose used for hydrogen gas, which is necessary for high gas barrier properties and flexibility.

The invention claimed is:

1. A polyvinyl alcohol resin composition comprising (A) a polyvinyl alcohol resin (abbreviated as PVA resin); and (B) a mixture of block copolymers, said block copolymers each containing a block of an aromatic vinyl polymer, and at least one of a block of a conjugated diene polymer and a hydrogenated block of the conjugated diene polymer, wherein the (A) PVA resin contains a structural unit of the following formula (1), and wherein a weight ratio ((A)/(B)) of the contents of the (A) PVA resin to the (B) mixture of block copolymers is in the range of 90/10 to 75/25, and a ratio ($\eta_A/\eta_B$) of the melt viscosity $\eta_A$ of the (A) PVA resin to the melt viscosity $\eta_B$ of the (B) mixture of block copolymers is in the range of 1/3 to 3/1, and wherein the (B) mixture of block copolymers includes (B1) a block copolymer having no carboxyl group and (B2) a block copolymer modified with a carboxyl group-containing compound, and a weight ratio ((B1)/(B2)) of the (B1) block copolymer to the (B2) block copolymer is in the range of 70/30 to 30/70:

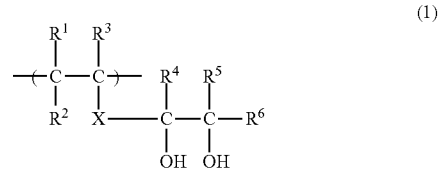

wherein each of $R^1$, $R^2$ and $R^3$ independently represents a hydrogen or an organic group, X represents a single bond or a linking chain, and each of $R^4$, $R^5$ and $R^6$ independently represents a hydrogen or an organic group.

2. The polyvinyl alcohol resin composition according to claim 1, wherein the (B2) block copolymer has an acid value of 0.5 to 20 mg $CH_3ONa/g$.

3. The polyvinyl alcohol resin composition according to claim 2, wherein the (B2) block copolymer has an acid value of 1.5 to 8 mg $CH_3ONa/g$.

4. The polyvinyl alcohol resin composition according to claim 1, wherein a weight ratio ((B1)/(B2)) of the contents of (B1) block copolymer to (B2) block copolymer is in the range of 40/60 to 60/40.

5. A molded article obtained by melt molding a resin composition comprising (A) a polyvinyl alcohol resin (abbreviated as PVA resin); and (B) a mixture of block copolymers, said block copolymers each containing a block of an aromatic vinyl polymer, and at least one of a block of a conjugated diene polymer and a hydrogenated block of the conjugated diene polymer, wherein the (A) PVA resin contains a structural unit of the following formula (1), and wherein a weight ratio ((A)/(B)) of the contents of the (A) PVA resin to the (B) mixture of block copolymers is in the range of 90/10 to 75/25, and a ratio ($\eta_A/\eta_B$) of the melt viscosity $\eta_A$ of the (A) PVA resin to the melt viscosity $\eta_B$ of the (B) mixture of block copolymers is in the range of 1/3 to 3/1, and wherein the (B) mixture of block copolymers includes (B1) a block copolymer having no carboxyl group and (B2) a block copolymer modified with a carboxyl group-containing compound, and a weight ratio ((B1)/(B2)) of the (B1) block copolymer to the (B2) block copolymer is in the range of 70/30 to 30/70:

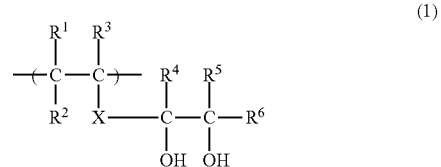

wherein each of $R^1$, $R^2$ and $R^3$ independently represents a hydrogen or an organic group, X represents a single bond or a linking chain, and each of $R^4$, $R^5$ and $R^6$ independently represents a hydrogen or an organic group.

* * * * *